United States Patent
Nelson et al.

(10) Patent No.: US 12,497,020 B2
(45) Date of Patent: Dec. 16, 2025

(54) CONTROL OF A HYBRID POWERTRAIN SYSTEM

(71) Applicant: Caterpillar Paving Products Inc., Brooklyn Park, MN (US)

(72) Inventors: Ryan J. Nelson, Maple Grove, MN (US); Toby A. Frelich, Saint Michael, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 331 days.

(21) Appl. No.: 18/313,486

(22) Filed: May 8, 2023

(65) Prior Publication Data

US 2024/0375636 A1 Nov. 14, 2024

(51) Int. Cl.
| | |
|---|---|
| *B60W 20/13* | (2016.01) |
| *B60W 10/06* | (2006.01) |
| *B60W 10/08* | (2006.01) |
| *B60W 10/26* | (2006.01) |

(52) U.S. Cl.
CPC ............ *B60W 20/13* (2016.01); *B60W 10/06* (2013.01); *B60W 10/08* (2013.01); *B60W 10/26* (2013.01); *B60W 2300/152* (2013.01); *B60W 2300/158* (2013.01); *B60W 2300/17* (2013.01); *B60W 2510/06* (2013.01); *B60W 2510/244* (2013.01); *B60W 2556/10* (2020.02); *B60W 2710/08* (2013.01); *B60W 2710/244* (2013.01)

(58) Field of Classification Search
CPC ...... B60W 20/13; B60W 10/06; B60W 10/08; B60W 10/26; B60W 2300/152; B60W 2300/158; B60W 2300/17; B60W 2510/06; B60W 2510/244; B60W 2556/10; B60W 2710/08; B60W 2710/244; Y02T 10/62
See application file for complete search history.

(56) References Cited

U.S. PATENT DOCUMENTS

| | | | |
|---|---|---|---|
| 8,905,166 | B2 | 12/2014 | Dalum et al. |
| 9,382,675 | B2 | 7/2016 | Frelich et al. |
| 9,593,723 | B2 | 3/2017 | Anderson et al. |

(Continued)

FOREIGN PATENT DOCUMENTS

| | | |
|---|---|---|
| CN | 210554230 U | 5/2020 |
| CN | 112195730 A | 1/2021 |

(Continued)

OTHER PUBLICATIONS

"XCMG New 6m Paver Machine Rp6051 World's First Gas-Electric Hybrid Paver Exhibited At Bauma," XCMG E-Commerce, Inc., 2017, https://www.machmall.com/item-detail/XCMG-RP605L-6789.html, 7 pages.

*Primary Examiner* — Russell Frejd
*Assistant Examiner* — Ana D Thomas (57) ABSTRACT

In some implementations, a controller of a hybrid powertrain system may detect a level of demand associated with the load of the hybrid powertrain system. The controller may cause power to be proportionally provided to drive the load via the engine and the electric machine in accordance with a ratio between a first power output provided via the engine and a second power output provided via the electric machine, the ratio being associated with the level of the demand, a control mode associated with the hybrid powertrain system, and an operating mode associated with the hybrid powertrain system.

20 Claims, 5 Drawing Sheets

(56) References Cited

U.S. PATENT DOCUMENTS

| | | |
|---|---|---|
| 9,643,593 B2 | 5/2017 | Dalum |
| 2016/0097429 A1 | 4/2016 | Anderson et al. |
| 2021/0254696 A1* | 8/2021 | Wu .................. E02F 9/202 |
| 2022/0389666 A1* | 12/2022 | Farr .................. E01C 23/04 |

FOREIGN PATENT DOCUMENTS

| | | | |
|---|---|---|---|
| EP | 2836409 B1 | 10/2019 | |
| JP | 4633813 B2 * | 2/2011 | ............. Y02T 10/62 |

* cited by examiner

CONTROL OF A HYBRID POWERTRAIN SYSTEM

TECHNICAL FIELD

The present disclosure relates generally to powertrains and, for example, to control of a hybrid powertrain system.

BACKGROUND

Internal combustion engines may be used to power different devices and/or machines. Internal combustion engines provide reliable power. However, internal combustion engines are associated with several drawbacks. For example, emissions from internal combustion engines may impact the environment and/or human health. Internal combustion engines produce a range of harmful pollutants, such as carbon monoxide, nitrogen oxides, particulate matter, and/or volatile organic compounds, among other examples. Internal combustion engines may be associated with high fuel costs, as fuel is consumed continuously while an internal combustion engine is operating, even during idling or waiting times. As another example, internal combustion engines produce a high level of noise. The noise produced by an internal combustion engine can be a nuisance for drivers and passengers, and in particular, may obstruct communication among a work crew for a machine that uses the internal combustion engine. Moreover, internal combustion engines produce significant amounts of heat. Accordingly, a machine that uses an internal combustion engine may utilize a large cooling package to dissipate heat.

European Patent No. 2836409 (the '409 patent) discloses a vehicle drive system for a vehicle including a first prime mover, a first prime mover driven transmission, and a rechargeable power source. The vehicle drive system includes an electric motor and a control system. The electric motor is in direct or indirect mechanical communication with the first prime mover at a point between the first prime mover and the first prime mover driven transmission. The electric motor can provide power to the prime mover driven transmission and receive power from the first prime mover. The control system causes the electric motor to rotate the first prime mover at a speed higher than an idle set point of the first prime mover while the vehicle is stopped, thereby reducing fuel consumption at idle to the vehicle.

However, the '409 patent does not disclose a control system for controlling the flow of power associated with the first prime mover, the electric motor, and/or a battery of the vehicle drive system. The controller of the present disclosure solves one or more of the problems set forth above and/or other problems in the art.

SUMMARY

A controller for a hybrid powertrain system may include an engine and an electric machine configured to provide power to a load may include one or more memories; and one or more processors configured to: detect a level of demand associated with the load of the hybrid powertrain system; and cause power to be proportionally provided to drive the load via the engine and the electric machine in accordance with a ratio between a first power output provided via the engine and a second power output provided via the electric machine, the ratio being associated with the level of the demand, a control mode associated with the hybrid powertrain system, and an operating mode associated with the hybrid powertrain system.

A method may include causing, by a controller of a hybrid powertrain system, a load of the hybrid powertrain system to be powered via an engine of the hybrid powertrain system based on a first value of a power level associated with the load not being equal to or exceeding a power threshold; causing, by the controller and based on the first value of the power level associated with the load not being equal to or exceeding the power threshold, power to be provided to charge one or more batteries, of the hybrid powertrain system, via an electric machine that is driven via the engine; detecting, by the controller, that a second value of the power level associated with the load at least meets the power threshold; and causing, by the controller, the load of the hybrid powertrain system to be powered via the engine and the electric machine based on the second value of the power level associated with the load at least meeting the power threshold, wherein the electric machine obtains power via the one or more batteries.

A hybrid powertrain system may include an engine mechanically coupled to a load; an electric machine that is configured to operate as both an electric motor and a generator, the electric machine being mechanically coupled to the engine and the load; one or more batteries configured to provided power to, or receive power from, the electric machine; and a controller configured to: cause power to be provided from the electric machine to the one or more batteries to charge the one or more batteries based on the engine operating in an idling mode; and cause, based on a level of demand of the load and based on the engine operating in an operational mode, power to be provided to the load via a first power output of the engine and a second power output of the electric machine in accordance with a ratio between the first power output and the second power output, the ratio being based on the level of demand of the load.

DETAILED DESCRIPTION

This disclosure relates to a controller, which is applicable to any machine that includes a hybrid powertrain system (e.g., a powertrain driven by one or more engines and one or more electric motors). For example, the machine may be a vehicle, a compactor machine, a paving machine, a cold planer, a grading machine, a backhoe loader, a wheel loader, a harvester, an excavator, a motor grader, a skid steer loader, a tractor, a dozer, a hydraulic fracturing system, a boat, a pump, a pump system, a generator system, and/or another machine that uses power generated via a hybrid powertrain system.

Figure 1:
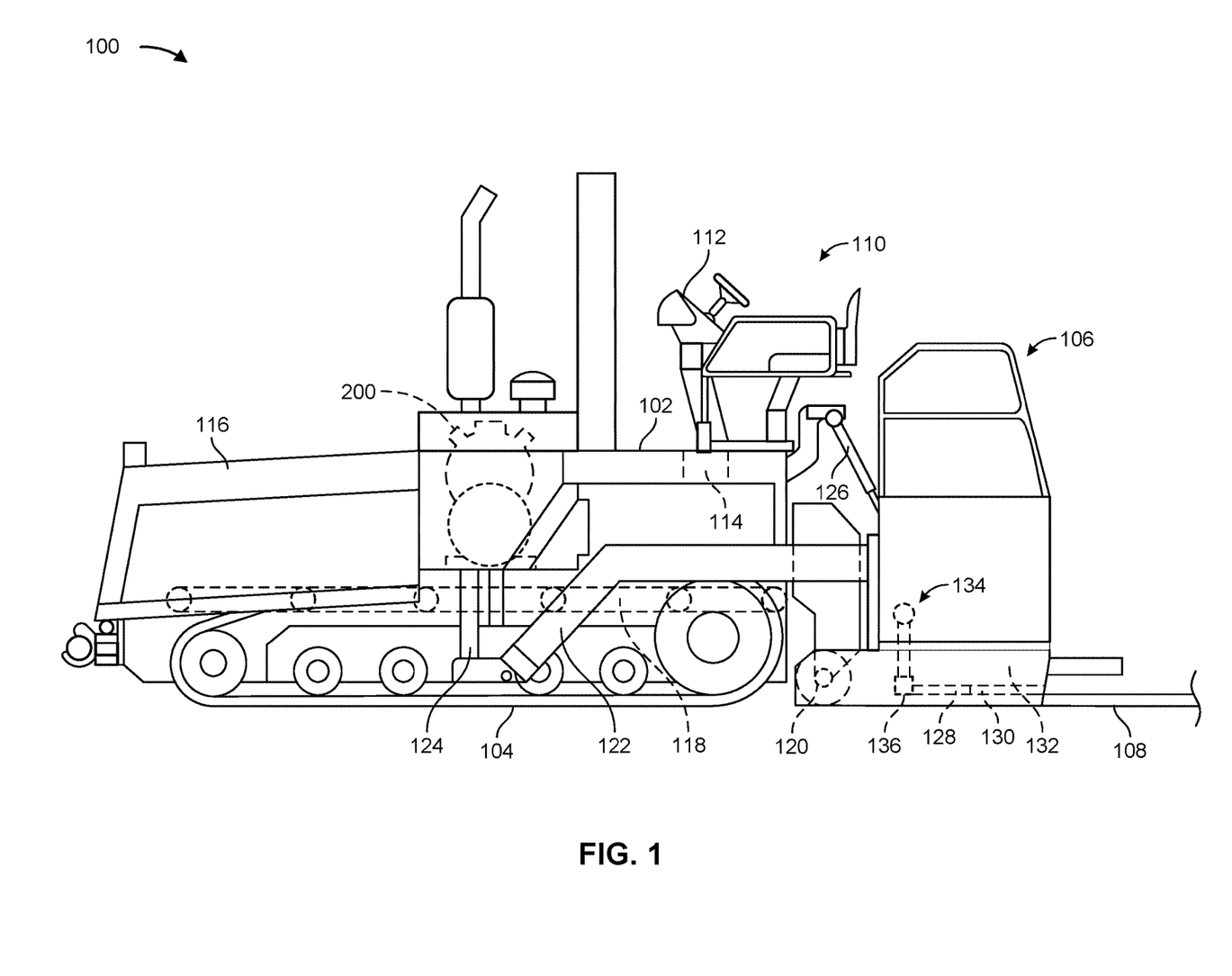
FIG. 1 is a side elevational view of an example machine described herein.

FIG. 1 is a side elevational view of an example machine 100 described herein. FIG. 1 shows an example where the machine 100 is a paving machine. However, as described above, the machine 100 may be any machine that includes a hybrid powertrain system.

The machine 100 includes a frame 102 with a set of ground-engaging elements 104 such as tracks or wheels coupled with the frame 102. The ground-engaging elements 104 may be driven by a hybrid powertrain system 200. Additionally, or alternatively, the hybrid powertrain system 200 may drive or power another component or system of the machine 100, such as one or more pumps (e.g., of a hydraulic power system of the machine 100) and/or other components described herein. A screed 106 can be positioned at the rear end of the machine 100 to spread and compact paving material into an asphalt mat 108 having a desired thickness, size, uniformity, crown profile, and cross slope. The machine 100 also includes an operator station 110 having a seat and a console, which includes various controls for directing operations of the machine 100 by inputting instructions at an input panel 112. A controller 114 is provided for electrically controlling various aspects of the machine 100. For example, the controller 114 can send and receive signals from various components of the machine 100 during the operation of the machine 100.

The machine 100 further includes a hopper 116 for storing a paving material, and a conveyor system including one or more conveyors 118 configured to move paving material from the hopper 116 to the screed 106 at the rear of the machine 100. One or more augers 120 are arranged near the forward end of the screed 106 to receive the paving material supplied by the conveyor 118 and spread the material evenly beneath the screed 106. The screed 106 can be pivotally coupled behind the machine 100 by one or more tow arms 122 that extend between the frame 102 of the paving machine and the screed 106. Alternatively, the screed 106 can be pivotally coupled behind the machine 100 by a pair of tow arms 122 that extend between a tow point on the frame 102 of the machine 100 and the screed 106.

The tow arms 122 can also have the tow point raised and lowered on the machine 100 using a positioning cylinder 124 which, when moved up and down, moves the tow point of the tow arms 122 and changes an angle of attack of the screed 106. Also, as part of a paving process, one or more cylinders 126 on the screed 106 can raise or lower portions of the screed 106. For example, to change a height or paving angle of a main screed plate 128, the machine 100 may use one or more extender screed plates 130. The screed 106 can include a screed frame 132 with the main screed plate 128 coupled to the screed frame 132. The screed plate 128 is configured to float on the paving material of the asphalt mat 108 laid upon a prepared paving bed and to "smooth" or level and compact the paving material on the base surface, such as for example a roadway or roadbed. The screed 106 can further include the one or more extender screed plates 130 that extend beyond the main screed plate 128 to extend the paving width of the screed 106.

The screed 106 can include a tamper bar assembly 134 positioned forward of the screed plate 128 and extending transversely to the direction of travel of the machine 100. The tamper bar assembly 134 may include a tamper bar 136. The tamper bar assembly 134 can be coupled to the screed frame 132 of screed 106 and configured such that the tamper bar 136 is reciprocated in an upward and downward direction substantially perpendicular to the asphalt mat 108 and substantially perpendicular to the direction of travel of the machine 100. The tamper bar assembly 134 pre-compacts the paving material as the machine 100 moves forward and the screed 106 smooths the paving material to remove air pockets and other voids to create a relatively flat, paved surface.

As indicated above, FIG. 1 is provided as an example. Other examples may differ from what is described with regard to FIG. 1.

Figure 2:
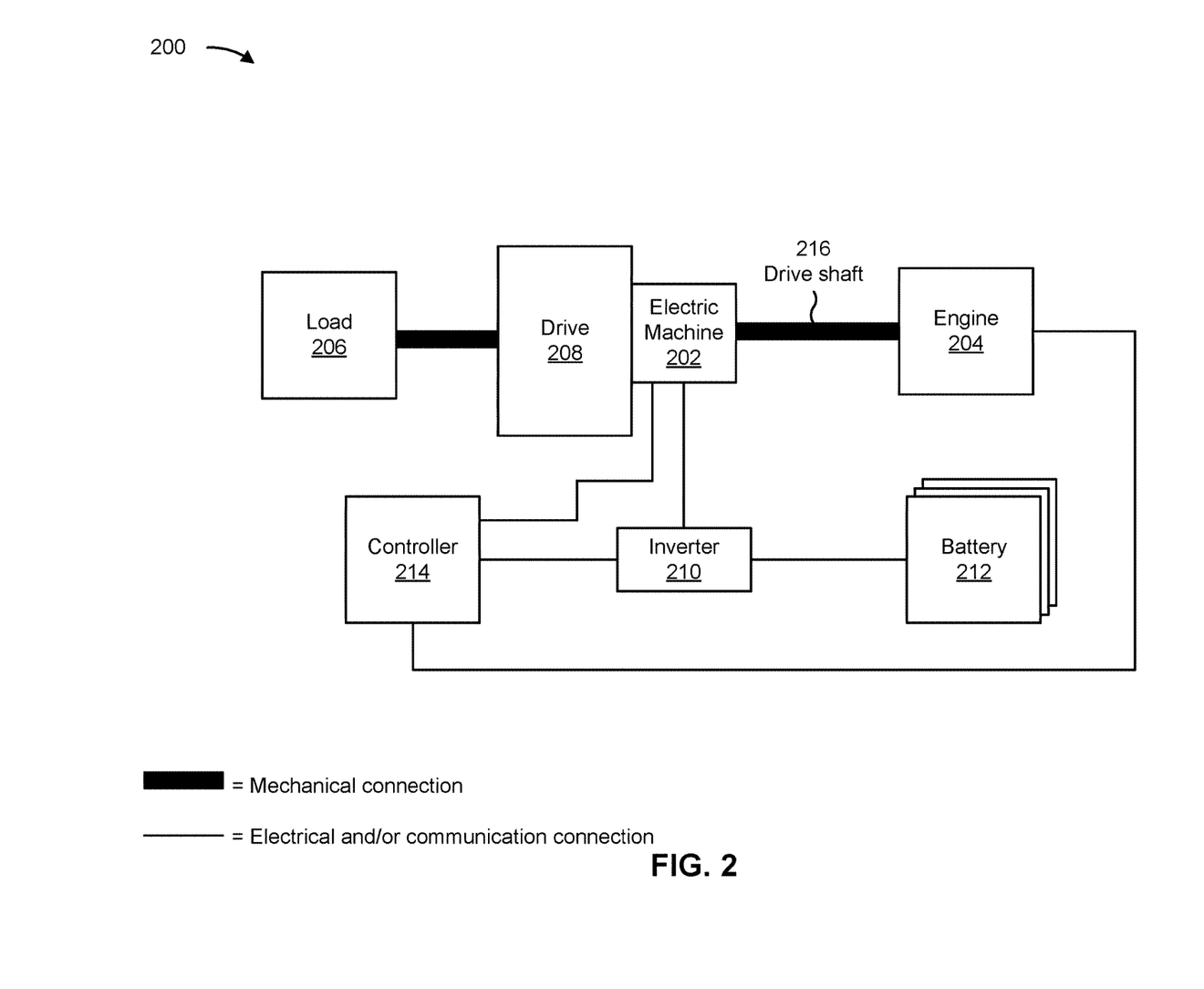
FIG. 2 is a diagram of an example hybrid powertrain system described herein.

FIG. 2 is a diagram of an example hybrid powertrain system 200 described herein. The hybrid powertrain system 200 may power or drive the machine 100 and/or a component or device of the machine 100. The hybrid powertrain system 200 include one or more electric machines 202 and one or more engines 204 configured to drive or power a load 206. The hybrid powertrain system 200 is configured to transmit power from the one or more electric machines 202 and the one or more engines 204 to the load 206.

The electric machine 202 may be a machine that is configured to operate as both an electric motor and a generator (e.g., based on a direction of flow of power to or from the electric machine 202). The electric machine 202 may be a switched reluctance machine, an induction motor machine, and/or a brushless permanent magnet motor machine, among other examples.

The engine 204 may be an internal combustion engine. For example, the engine 204 may be powered by fuel, such as gasoline, oil, and/or natural gas, among other examples. The engine 204 may include a cylinder block, cylinder head, pistons, connecting rods, crankshaft, valves, camshaft, spark plugs, fuel injectors, and/or an air intake system, among other examples. The engine 204 and the electric machine 202 may be mechanically coupled, such as via a drive shaft 216. For example, the engine 204 may produce mechanical power that causes the drive shaft 216 to rotate. The electric machine 202 may be mechanically coupled to the drive shaft 216 (the term "mechanically coupled" encompasses both the direct and indirect connection of the engine 204, the electric machine 202, and/or the drive shaft 216, for example, through one or more clutches or gearsets). For example, the engine 204 may be configured to rotate a shaft of the electric machine 202. The electric machine 202 may be configured to receive power from the drive shaft 216 (e.g., when the electric machine 202 is operating in a generator mode) and provide power to the drive shaft 216 (e.g., when the electric machine 202 is operating in a motor mode).

The electric machine 202 and/or the engine 204 are configured to drive or power the load 206. For example, the electric machine 202 and/or the engine 204 are mechanically coupled to a drive 208 (e.g., a drive box or a gear box) of the load 206. As shown, the electric machine 202 and the engine 204 may be arranged in series to drive or power the load 206. However, in some examples, the electric machine 202 and the engine 204 may be arranged in parallel to drive or power the load 206. In some example, the electric machine 202 and the engine 204 are mechanically coupled directly to the load 206, such as via the drive shaft 216 (e.g., without a drive 208). As another example, the drive shaft 216 may be configured to provide mechanical power to the drive 208. The drive 208 is configured to transfer the mechanical power to the load 206. The load 206 may be the machine 100, a component or system of the machine 100, one or more pumps, a pump system, a vehicle (e.g., wheels of the vehicle and/or the ground-engaging elements 104), a generator, a tool, and/or another machine or component.

The electric machine 202 is electrically coupled to one or more batteries 212 via an inverter 210. The one or more batteries 212 are configured to provide electric power to the electric machine 202 (e.g., to power the electric machine 202 when the electric machine 202 is operating in a motor mode). Additionally, the one or more batteries 212 are configured to receive electric power from the electric machine 202 (e.g., to charge the one or more batteries 212 when the electric machine 202 is operating in a generator mode). The inverter 210 may be a device capable of converting direct current (DC) to alternative current (AC), and vice-versa. The inverter 210 may be a variable frequency drive.

For example, the one or more batteries 212 may be a source of DC power, while the electric machine 202 is used as a load that requires AC power. The inverter 210 serves as an interface between the two components by converting the DC power from the one or more batteries 212 to AC power that can be used to power the electric machine 202 and/or converting AC power provided by the electric machine 202 to DC power to be provided to charge the one or more batteries 212. The inverter 210 is capable of bidirectional power flow. This means that the inverter 210 can operate in both directions, converting DC power to AC power when the flow of power is in one direction, and converting AC power to DC power when the flow of power is in the opposite direction. By controlling the direction of the power flow through the inverter 210, the direction of electrical power can be controlled. As another example, one or more components, such as a power diode or a power switch, may be used to control the direction of power flow. For example, a power diode can be used to allow current to flow in one direction only, while blocking current flow in the opposite direction. Similarly, a power switch, such as a transistor, can be used to selectively connect or disconnect a load from a power source, allowing the direction of power flow to be controlled. For example, the controller 214 may configure the direction of flow of power between the electric machine 202 and the one or more batteries 212.

The controller 214 may be the controller 114 or may be a separate controller. The controller 214 may include one or more processors and one or more memories. The processor may include a central processing unit, a graphics processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. The processor may include one or more processors capable of being programmed to perform one or more operations or processes described elsewhere herein. The memory may include volatile and/or nonvolatile memory. For example, the memory may include random access memory (RAM), read only memory (ROM), a hard disk drive, and/or another type of memory (e.g., a flash memory, a magnetic memory, and/or an optical memory). The memory may include internal memory (e.g., RAM, ROM, or a hard disk drive) and/or removable memory (e.g., removable via a universal serial bus connection). The memory may be a non-transitory computer-readable medium. The memory may store information, one or more instructions, and/or software (e.g., one or more software applications) related to the operation of the controller 214. The memory may include one or more memories that are coupled (e.g., communicatively coupled) to the one or more processors, such as via a bus. Communicative coupling between a processor and a memory may enable the processor to read and/or process information stored in the memory and/or to store information in the memory.

The controller 214 may perform one or more operations or processes described herein. For example, a non-transitory computer-readable medium (e.g., memory) may store a set of instructions (e.g., one or more instructions or code) for execution by the processor. The processor may execute the set of instructions to perform one or more operations or processes described herein. In some implementations, execution of the set of instructions, by one or more processors, causes the one or more processors and/or the controller 214 to perform one or more operations or processes described herein. Hardwired circuitry may be used instead of or in combination with the instructions to perform one or more operations or processes described herein.

For example, the controller 214 may cause power to be proportionally provided to drive the load 206 via the engine 204 and the electric machine 202 in accordance with a ratio between a first power output provided via the engine and a second power output provided via the electric machine. The controller 214 may configure the engine 204 to provide a first torque output and the electric machine 202 to provide a second torque output (e.g., to drive the drive shaft 216, the drive 208, and/or the load 206) based on a level of demand of the load 206. For example, the controller 214 may detect a level of demand associated with the load 206. The level of demand may be a torque level, a power level, and/or an energy level, among other examples. The controller 214 may determine a ratio between a power provided by the engine 204 and a power provided by the electric machine 202 to meet the level of demand or other operational parameters associated with the load 206 (e.g., in an efficient manner, in a low-noise manner, in a maximum-power manner).

The controller 214 may obtain one or more sensor measurements associated with the hybrid powertrain system 200. The sensor measurements may include a power output of the engine 204, a torque output of the engine 204, a power output of the electric machine 202, a torque output of the electric machine 202, a power input to the electric machine 202, a level of electric energy output by the electric machine 202 (e.g., a voltage and/or a current input to the electric machine 202), and/or a level of demand of the load 206 (e.g., a power level, a torque level, a pressure, a speed, and/or another level of demand), among other examples. The sensor measurements may include a state of charge of the one or more batteries 212. The hybrid powertrain system 200 may include one or more sensors configured to communicate with the controller 214, such as one or more torque sensors, one or more dynamometers, one or more accelerators, one or more strain gauges, one or more pressure sensors, one or more voltage sensors, and/or one or more other sensors configured to measure the sensor measurements. The controller 214 may obtain (e.g., periodically) the sensor measurements from the one or more sensors.

The controller 214 may be configured to control the flow of mechanical and electrical energy associated with the hybrid powertrain system 200. For example, the controller 214 may be configured to control the flow of mechanical energy to the load 206 and the flow of electrical energy from the one or more batteries 212 or to the one or more batteries 212. For example, the controller 214 may be configured to control a charging rate of the one or more batteries 212 (e.g., that are charged via electrical energy or power output via the electric machine 202). The controller 214 may control the flow of mechanical and electrical energy associated with the hybrid powertrain system 200 based on the level of demand of the load 206, a control mode associated with the hybrid powertrain system 200, and/or an operating mode associated with the hybrid powertrain system 200, among other examples.

For example, the controller 214 may be associated with multiple control modes for controlling the hybrid powertrain system 200. A control mode may define how the controller 214 ramps up or down a charging rate of the one or more batteries, sets the ratio of power levels, and/or determines when to switch the electric machine 202 from operating as a generator to operating as an electric motor, among other examples. For example, the multiple control modes may include a first control mode (e.g., depicted and described in more detail in connection with FIG. 3) and a second control mode (e.g., depicted and described in more detail in connection with FIG. 4). The first control mode may be a battery charging mode (e.g., associated with providing additional charge to the one or more batteries 212) and the second control mode may be an efficiency mode (e.g., associated with improving a fuel efficiency of the engine 204). The controller 214 may determine a control mode, from the multiple control modes, based on a state of charge (SoC) of the one or more batteries 212. For example, if the SoC does not satisfy an SoC threshold (e.g., is less than or is less than or equal to the SoC threshold), then the controller 214 may determine that the first control mode (e.g., the battery charging mode) is to be used to control the hybrid powertrain system 200. If the SoC does satisfy the SoC threshold (e.g., is greater than or is greater than or equal to the SoC threshold), then the controller 214 may determine that the second control mode (e.g., the efficiency mode) is to be used to control the hybrid powertrain system 200. This enables the controller 214 to cause additional charge to be provided to the one or more batteries 212 when the one or more batteries 212 have a low charge and to improve the efficiency (e.g., the fuel efficiency) of the hybrid powertrain system 200 when the one or more batteries 212 have a high charge.

The controller 214 may be associated with multiple operational modes. An operational mode may be associated with a function or current use case of the machine 100. An operational mode may define how the controller 214 ramps up or down a charging rate of the one or more batteries and/or how the controller 214 ramps up or down a ratio of powers output by the engine 204 and/or the electric machine 202. As an example, the control mode may be represented with a graph depicting battery current versus machine power demand (e.g., from the graphs depicted in FIGS. 3 and 4) that is to be used to define control for the hybrid powertrain system 200 and the operational mode may be reflected in a slope or curve of the lines depicted in the graph. For example, an operational mode may include an efficiency mode (e.g., associated with providing maximized fuel efficiency for the hybrid powertrain system 200), a noise reduction mode (e.g., associated with reducing a noise level output by the hybrid powertrain system 200), and/or a performance mode (e.g., associated with improving a power output by the hybrid powertrain system 200), among other examples. The controller 214 may obtain an indication of the operational mode to be used via an operator input. For example, an operator may provide an input to the input panel 112. The controller 214 may determine the operational mode based on the input to the input panel 112.

The controller 214 may determine a power ratio or a power distribution (e.g., between a power provided by the electric machine 202 and a power provided by the engine 204) based on an efficiency metric. The efficiency metric may be based on, or otherwise associated with, a fuel consumption by (a fuel efficiency of) the engine, and/or a noise level produced by the hybrid powertrain system 200, among other examples. For example, the controller 214 may determine a power ratio or a power distribution associated with a highest efficiency metric for a given level of demand of the load 206. In other words, different power ratios and/or different power distributions may result in different levels of efficiency of the hybrid powertrain system 200 and/or of the engine 204. The controller 214 may determine, for a given level of demand of the load 206, a power ratio or a power distribution associated with the highest efficiency metric. The controller 214 may cause the hybrid powertrain system 200 to operate using the power ratio or the power distribution associated with the highest efficiency metric. As the level of demand of the load 206 changes, the controller 214 may change and/or determine the optimal power ratio or power distribution (e.g., associated with the highest efficiency metric) for other levels of demand.

In some implementations, the controller 214 may use a machine learning model (e.g., an artificial intelligence model) to determine the optimal power ratios and/or optimal power distributions for different levels of demands and/or in different use cases of the hybrid powertrain system 200. An input to the machine learning model may indicate power inputs and power outputs of the hybrid powertrain system 200 over time. For example, an input to the machine learning model may indicate historical fuel consumption of the engine 204 (or similar engines) at different levels of demand, different power outputs of the engine 204 (or similar engines) over time, historical power consumption of the electric machine 202 (or similar electric machines) at different levels of demand, different power outputs of the electric machine 202 (or similar electric machines) over time, and/or different battery SoCs and/or load demand levels at mode switching times.

The machine learning model may be trained to output the optimal power ratios and/or optimal power distributions for different levels of demands. For example, an output of the machine learning model may be a value of the efficiency metric for different power ratios at different levels of demand. As another example, the output of the machine learning model may be a value of optimal power ratios at different levels of demand (e.g., that result in an optimized or highest efficiency metric). For example, the machine learning model may learn a most efficient combination of electric machine 202 power and engine 204 power based on charging rates and/or discharging rates of the one or more batteries 212, electric machine 202 torque or power output, and/or engine 204 torque or power output. The machine learning model may output an indication of a power distribution or power rate (e.g., information similar to the graphs depicted in FIGS. 3 and 4) indicating most efficient power distribution for different levels of demand (e.g., in terms of fuel used versus battery energy used). The controller 214 may control the hybrid powertrain system 200 in accordance with the output of the machine learning model. The machine learning model may be a linear regression model, a random forest model, a support vector regression model, a gradient boosting model, and/or a neural network model, among other examples.

As indicated above, FIG. 2 is provided as an example. Other examples may differ from what is described with regard to FIG. 2.

Figure 3:
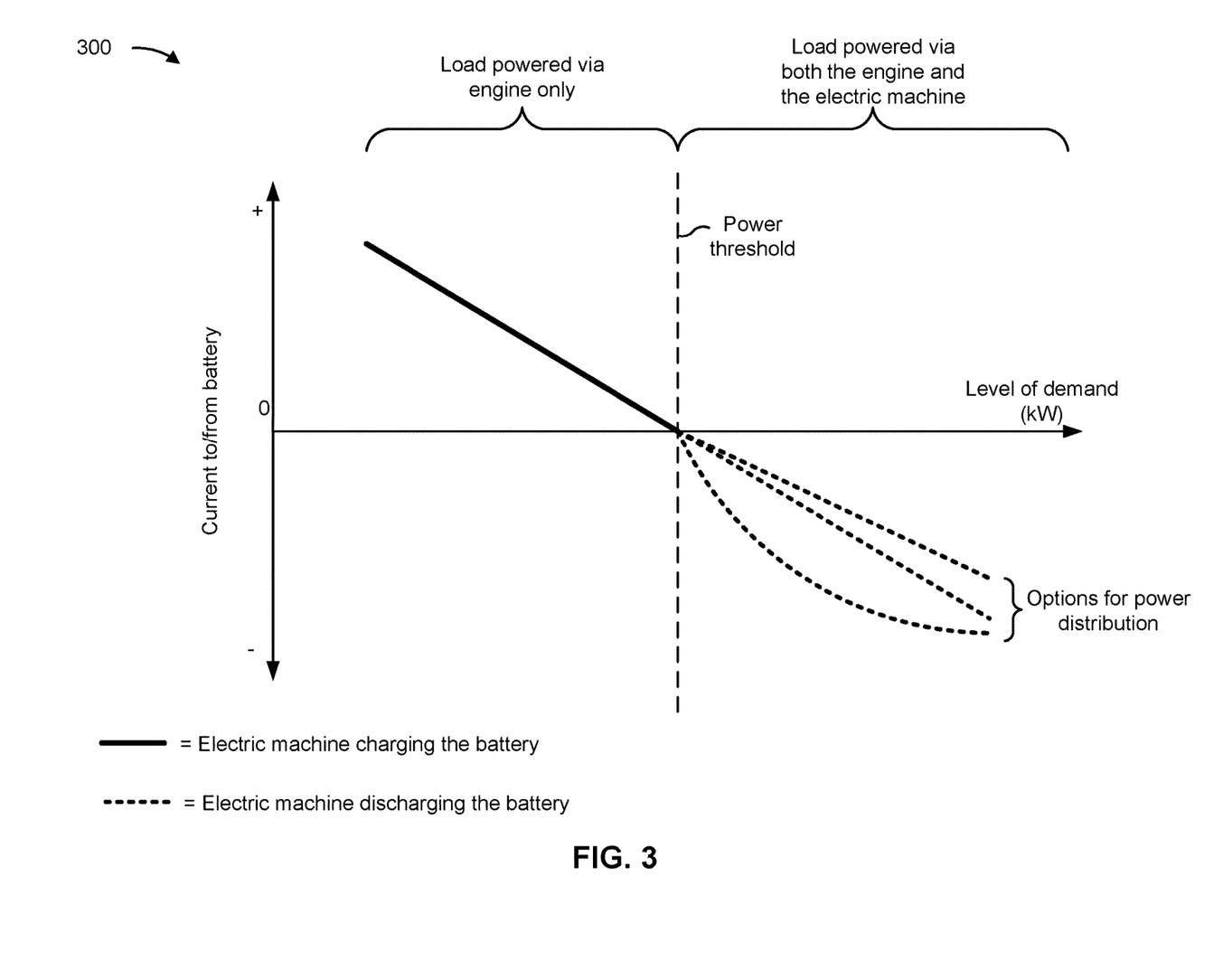
FIG. 3 is a diagram of an example control mode of the hybrid powertrain system described herein.

FIG. 3 is a diagram of an example control mode 300 of the hybrid powertrain system 200 described herein. The control mode 300 may be the first control mode described elsewhere herein.

The operations associated with the control mode 300 may be depicted via the graph shown in FIG. 3. As shown in FIG. 3, a vertical axis of the graph shows a current level to or from a battery (e.g., a battery 212). A horizontal axis of the graph shows a level of demand (e.g., of the load 206), shown in kilowatts as an example. In other examples, the level of demand may be measured in other units, such as revolutions per minute (RPM) (e.g., where the level of demand is a required rotational speed of the load 206), miles per hour (MPH) (e.g., where the level of demand is a speed of the load 206 and/or the machine 100), pounds per square inch (PSI) (e.g., where the level of demand is a pressure output of the load 206), among other examples.

As shown in FIG. 3, the control mode 300 may be associated with first ramping up of a power output and/or torque of the engine 204, followed by adding or supplementing power output and/or torque of the electric machine 202 to power or drive the load 206. For example, while the level of demand of the load 206 is low, the controller 214 may cause the hybrid powertrain system 200 to power or drive the load via only the engine 204. For example, a first portion of the power output or torque output via the engine 204 may be used to drive or power the load 206. A second portion of the power output or torque output via the engine 204 may be used to generate current by the electric machine 202 (e.g., configured to act as a generator, such as by the controller 214). For example, a shaft of the electric machine 202 may be rotated via power or torque output by the engine 204 (e.g., when levels of demand of the load 206 are low). As shown in FIG. 3, a current level provided to the battery 212 during such times may be positive (e.g., may be used to charge the battery 212). For example, the electric machine may output current and/or electrical power to the inverter 210, the inverter 210 may convert the current and/or electrical power to DC, and the inverter may provide the current and/or electrical power to the battery 212 (e.g., to charge the battery 212).

For example, the controller 214 may cause the load 206 to be powered via the engine 204 based on a first value of a power level associated with the load (e.g., a first level of demand) not satisfying a power threshold. This corresponds to the downward-sloping line shown in the upper left quadrant of FIG. 3. The power threshold, shown as a dashed vertical line, is based on a power rating of the engine 204. As shown in FIG. 3, because the power output by the engine 204 has a maximum value, the amount of current available for charging the battery 212 decreases linearly as the level of demand for powering the load 206 increases. Nonlinear operation is also contemplated. The power rating may be an amount of power (e.g., a maximum amount of power) or torque that the engine 204 can output. The power threshold may be the power rating of the engine 204. As another example, the power threshold may be n % of the power rating (e.g., 95% of the power rating, 90% of the power rating, or another percentage of the power rating), such that the controller 214 causes the electric machine 202 to add supplementary power to the load 206 before the level of demand reaches the power rating of the engine 204. In other words, if the level of demand of the load 206 is less than (or equal to) the power threshold (e.g., to the left side of the power threshold as shown in the graph depicted in FIG. 3), then the controller 214 may cause the load 206 to be driven or powered via the engine 204 (e.g., and not the electric machine 202).

The controller 214 may cause, based on the first value of the power level associated with the load 206 (e.g., the first level of demand) not satisfying the power threshold (e.g., not exceeding the power threshold, not being greater than or equal to the power threshold, being less than the power threshold, and/or being less than or equal to the power threshold), power to be provided to charge the battery 212. As used herein, satisfying a threshold may, depending on the context, refer to a value being greater than the threshold, greater than or equal to the threshold, less than the threshold, less than or equal to the threshold, equal to the threshold, not equal to the threshold, or the like.

As shown in FIG. 3, a positive current may be provided to the battery 212 via the electric machine 202. The electric machine 202 may be driven or powered via the engine 204. For example, when the level of demand of the load 206 is low, such as during idling or waiting times during the operation of the machine 100, low torque may be provided from the engine 204 to the load 206 while additional torque from the engine 204 is used to generate current from the electric machine 202, passing the current through the inverter 210, and charging the battery 212. For example, if the level of demand of the load 206 is less than (or equal to) the power threshold (e.g., to the left side of the power threshold as shown in the graph depicted in FIG. 3), then the controller 214 may cause the load 206 to be driven or powered via the engine 204 and may cause the electric machine 202 to charge the battery 212 using the surplus power output of the engine 204. For example, the controller 214 may cause a flow of mechanical power to be provided from the engine 204 to the load 206 and to the electric machine 202 (e.g., when the level of demand of the load 206 does not satisfy or exceed the power threshold). Additionally, the controller 214 may cause a flow of electrical power to be provided from the electric machine 202 (e.g., generated via the mechanical power provided via the engine 204) to the battery 212 (e.g., via the inverter 210).

The controller 214 may control a charging rate of the battery 212 based on the power level associated with the load (e.g., where the charging rate is represented by the slope of the solid line in the graph depicted in FIG. 3 where a change in the current to or from the battery 212 changes the rate at which the battery 212 is charging). For example, the battery 212 may charge faster if the level of current provided to the battery 212 is higher. The controller 214 may decrease the charging rate as the power level associated with the load increases (e.g., as the level of demand increases). For example, as the level of demand of the load 206 approaches the power threshold, the controller 214 may decrease the charging rate (e.g., may decrease an amount of current provided to the battery 212). For example, the controller 214 may control the charging rate such that when the level of demand of the load 206 is equal to the power threshold, no current is provided to the battery 212 via the electric machine 202. Prior to reaching the power threshold, however, as the level of demand of the load 206 is increased, torque is still transferred from the engine 204 to the load 206, as well as to the electric machine 202. However, as the level of demand of the load 206 increases, less current is generated (e.g., proportionally or in steps) from the electric machine 202 to charge the battery 212. This enables the battery 212 to be charged during times of low demand from the load 206.

For example, the controller 214 may detect that a second value of the power level associated with the load 206 satisfies or exceeds the power threshold (e.g., is on the right side of the power threshold shown in FIG. 3). The controller 214 may cause the load 206 to be powered via the engine 204 and the electric machine 202 based on the second value of the power level associated with the load satisfying or exceeding the power threshold. For example, the controller 214 may cause a flow of mechanical power to be provided from the engine 204 to the load 206 and from the electric machine 202 to the load 206 (e.g., via the electric machine 202 providing power or torque to the drive 208). The controller 214 may cause a flow of electrical power to be provided from the battery 212 to the electric machine 202

(e.g., to power the electric machine 202 that is operating as an electric motor). For example, when the level of demand of the load 206 is higher than the engine torque and/or power capability (e.g., the power threshold and/or the power rating of the engine 204), the controller 214 may activate the electric machine 202 and cause the electric machine 202 to act as a motor, thereby adding torque and power to the drive shaft 216 and providing additional torque and power to the load 206.

The controller 214 may increase a power output of the electric machine 202 to the load 206 as the power level associated with the load increases (e.g., as the level of demand increases). For example, the controller 214 may cause an amount of current provided from the battery 212 to the electric machine 202 to increase as the level of demand increases. A rate at which the power output of the electric machine 202 is increased (e.g., corresponding to a slope of the dashed line on the right side of the graph depicted in FIG. 3) may be in accordance with a ratio between the power output or power distribution of the electric machine 202 and an engine power output. For example, as described elsewhere herein, the controller 214 may select a power distribution of a power ratio with a highest efficiency for a given level of demand. As shown in FIG. 3, different rates may be used by the controller 214 in different scenarios (e.g., based on an output of a machine learning model and/or based on an operational mode, as described in more detail elsewhere herein). In some examples, the rate at which the power output of the electric machine 202 is increased may be non-linear.

As an example, FIG. 3 shows three options for power distribution (shown in dashed lines) representing different rates at which the power output of the electric machine 202 can be increased. The topmost option shows current draw from the battery 212 and power supplied by the electric machine 202 increasing linearly at a first rate. The middle option shows current draw from the battery 212 and power supplied by the electric machine 202 increasing linearly at a second rate greater than the first rate. The bottommost option shows current draw from the battery 212 and power supplied by the electric machine 202 increasing non-linearly (e.g., current draw from the battery 212 and power supplied by the electric machine 202 is greater when the electric machine 202 initially switches from a generator mode to a motor mode). Options other than the three options shown in FIG. 3 may also be used.

As indicated above, FIG. 3 is provided as an example. Other examples may differ from what is described with regard to FIG. 3.

Figure 4:
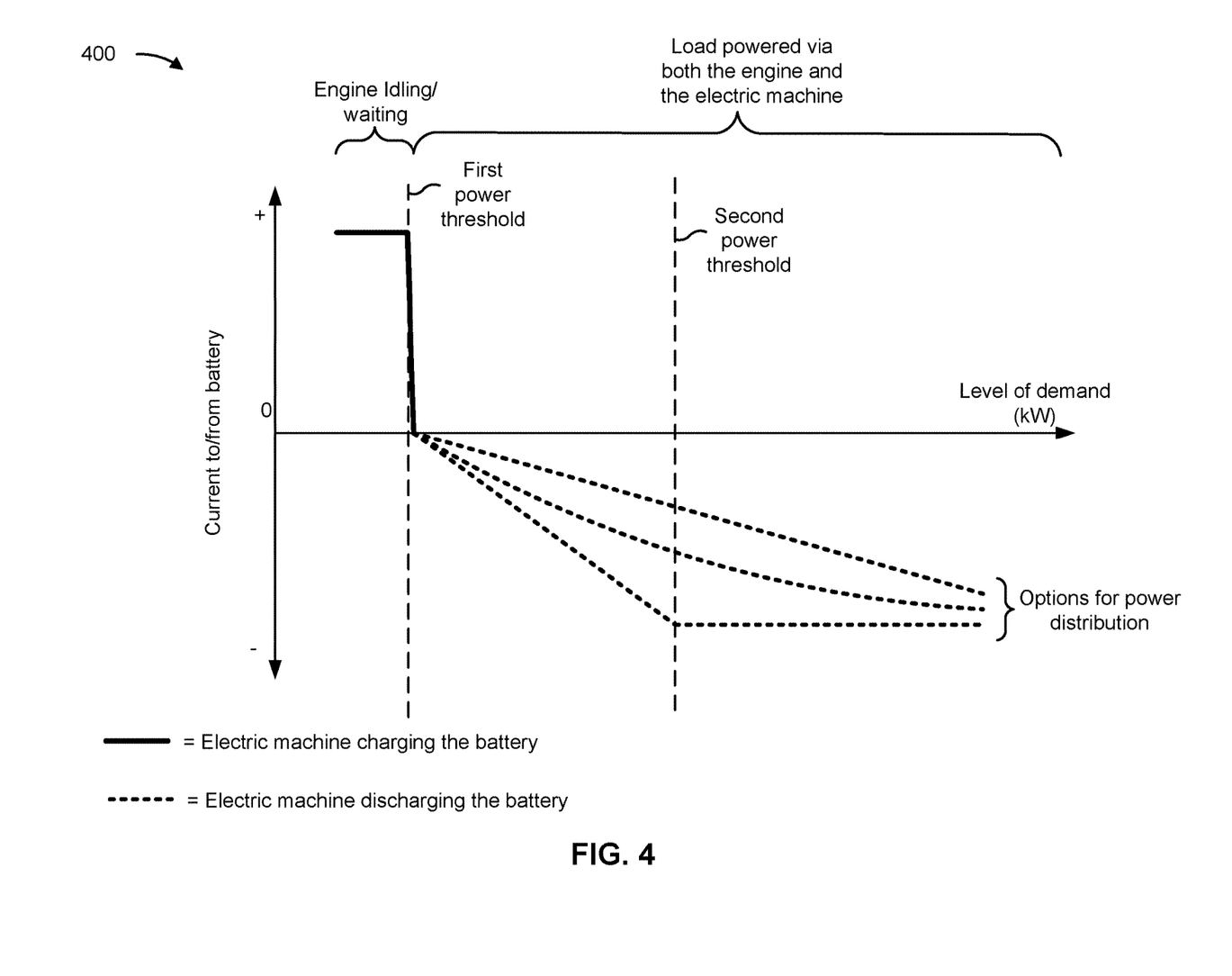
FIG. 4 is a diagram of an example control mode of the hybrid powertrain system described herein.

FIG. 4 is a diagram of an example control mode 400 of the hybrid powertrain system 200 described herein. The control mode 400 may be the second control mode described elsewhere herein.

The operations associated with the control mode 400 may be depicted via the graph shown in FIG. 4. As shown in FIG. 4, a vertical axis of the graph shows a current level to or from a battery (e.g., a battery 212). A horizontal axis of the graph shows a level of demand (e.g., of the load 206), shown in kilowatts as an example. In other examples, the level of demand may be measured in other units, such as RPM (e.g., where the level of demand is a required rotational speed of the load 206), MPH (e.g., where the level of demand is a speed of the load 206 and/or the machine 100), or PSI (e.g., where the level of demand is a pressure output of the load 206), among other examples.

As shown in FIG. 4, the controller 214 may cause power to be provided from the electric machine 202 to the battery 212 to charge the battery 212 based on the engine 204 operating in an idling mode. As used herein, "idling mode" may refer to a mode of operation where there the engine 204 is operating, but the level of demand is zero or close to zero (e.g., less than or equal to the first power threshold shown as a dashed vertical line in FIG. 4). For example, where the load 206 is a pump, the idling mode of the engine 204 may be associated with a power output sufficient merely to spin the pump and overcome parasitics.

When the engine 204 is idling, the controller 214 may cause a flow of mechanical power to be provided from the engine 204 to the electric machine 202. The electric machine may generate electrical power (e.g., may generate current). The controller 214 may cause the generated electrical power to be provided to the battery 212 (e.g., via the inverter 210) to charge the battery 212. In other words, the controller 214 may cause the load 206 to be powered using only the engine 204 based on the engine 204 operating in the idling mode. For example, in the idling mode, the engine 204 may output enough power to overcome system parasitics (e.g., of the hybrid powertrain system 200) and to provide sufficient power to the electric machine 202 to enable the electric machine 202 to generate enough current to charge the battery 212 (e.g., to at least trickle charge the battery 212). By causing the load 206 to be powered using only the engine 204, the controller 214 may cause the electric machine 202 to be driven by the engine 204 to generate power to charge the one or more batteries 212. As an example, the controller 214 may cause, in the control mode 400, the electric machine 202 to operate in a generator mode to charge the battery 212 based on the engine 204 operating in the idling mode. This enables the hybrid powertrain system 200 to utilize the mechanical power generated by the engine 204 during idling and/or periods of very low levels of demand (e.g., mechanical power that would have otherwise been not used or consumed productively by the machine 100) to charge the battery 212.

The controller 214 may cause the load 206 to be powered using the engine 204 and the electric machine 202 based on the engine operating in an operational mode. For example, the controller 214 may cause, in the control mode 400, the electric machine 202 to operate in a motor mode to power the load 206 based on the engine 204 operating in an operational mode. As used herein, "operational mode" may refer to a mode of operation where the engine 204 is operating to produce a power output for a level of demand that is greater than in the idling mode. For example, where the load 206 is a pump, the operational mode of the engine 204 may be associated with a power output greater than needed to merely to spin the pump and overcome parasitics.

The controller 214 may cause, based on a level of demand of the load and based on the engine operating in an operational mode (e.g., based on the level of demand of the load 206 causing the engine 204 to operate in the operational mode), power to be provided to the load via a first power output of the engine 204 and a second power output of the electric machine 202 in accordance with a ratio between the first power output and the second power output. The ratio may be based on the level of demand of the load 206. For example, the controller 214 may detect that the level of demand of the load 206 is greater than or equal to the first power threshold. The controller 214 may cause the electric machine 202 to be configured to act as an electric motor (e.g., switching a direction of flow of electrical power to be from the battery 212 to the electric machine 202). The controller 214 may cause the load 206 to be powered via the engine 204 and the electric machine 202 based on the level of demand of the load 206 being greater than or equal to the first power threshold. The first power threshold may be a level of demand that causes the engine 204 to transition from the idling mode to an operational mode.

For example, when a working load is placed on the hybrid powertrain system 200, the controller 214 may cause the electric machine 202 to apply torque to the drive shaft 216 to help drive the load 206. This reduces a fuel consumption of the engine 204 by using battery energy instead (e.g., electrical power provided by the battery 212). For example, the controller 214 may increase the second power output of the electric machine 202 relative to the first power output of the engine 204 as the level of demand of the load 206 increases. A rate at which the second power output of the electric machine 202 is increased may be associated with an efficiency metric, as described in more detail elsewhere herein.

The controller 214 may increase the power output of the electric machine 202 at a first rate when the level of demand is greater than or equal to the first power threshold and less than or equal to a second power threshold. The second power threshold may be, or may be similar to, the power threshold described and depicted in connection with FIG. 3 (e.g., that is based on a power rating of the engine 204). The controller 214 may increase the power output of the electric machine 202 at a second rate when the level of demand is greater than or equal to the second power threshold. In some examples, the rate of increase of the power output of the electric machine 202 (e.g., the first rate and/or the second rate) may be proportional to the increase of the level of demand. In other examples, the controller 214 may increase the power output of the electric machine 202 in steps (e.g., incrementally by a fixed value at each step).

In a similar manner as described elsewhere herein, a rate at which the power output of the electric machine 202 is increased (e.g., corresponding to a slope of the dashed line depicted in FIG. 4), may be in accordance with a ratio between the power output or power distribution of the electric machine 202 and an engine power output. For example, the controller 214 may select a power distribution or a power ratio with a highest efficiency for a given level of demand. As shown in FIG. 4, different rates may be used by the controller 214 in different scenarios (e.g., based on an output of a machine learning model and/or based on an operational mode, as described in more detail elsewhere herein). In some examples, the rate at which the power output of the electric machine 202 is increased may be non-linear.

As an example, FIG. 4 shows three options for power distribution (shown in dashed lines) representing different rates at which the power output of the electric machine 202 can be increased. The topmost option shows current draw from the battery 212 and power supplied by the electric machine 202 increasing linearly at a first rate. The middle option shows current draw from the battery 212 and power supplied by the electric machine 202 increasing non-linearly. The bottommost option shows current draw from the battery 212 and power supplied by the electric machine 202 increasing linearly at a second rate, greater than the first rate, up to the second power threshold, and then remaining at a constant level (e.g., which may represent a maximum current draw and/or power output). Options other than the three options shown in FIG. 4 may also be used.

As indicated above, FIG. 4 is provided as an example. Other examples may differ from what is described with regard to FIG. 4.

Figure 5:
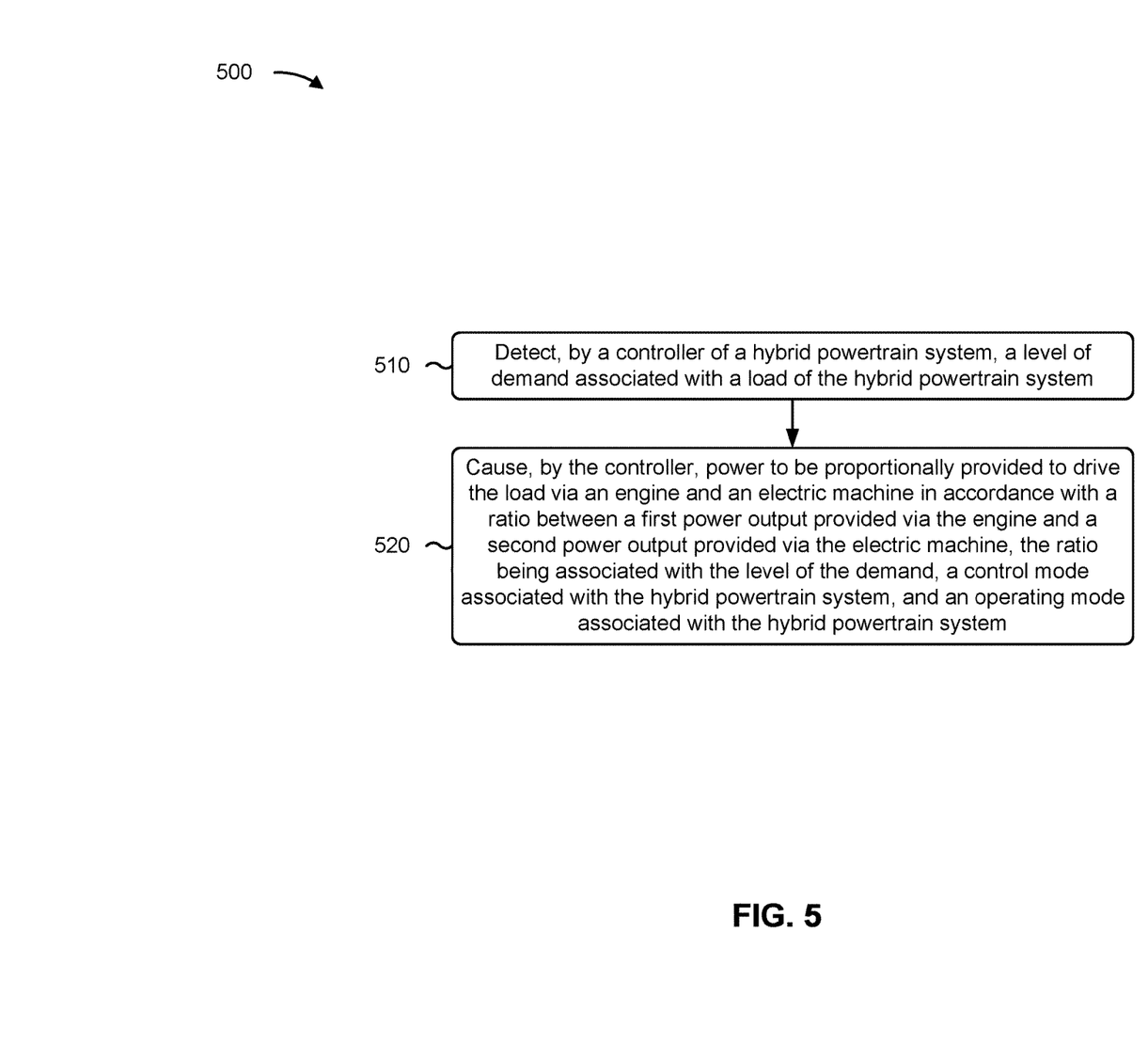
FIG. 5 is a flowchart of an example process associated with control of a hybrid powertrain system.

FIG. 5 is a flowchart of an example process 500 associated with control of a hybrid powertrain system. One or more process blocks of FIG. 5 may be performed by a controller (e.g., the controller 214). Additionally, or alternatively, one or more process blocks of FIG. 5 may be performed by another device or a group of devices separate from or including the controller, such as another device or component that is internal or external to the hybrid powertrain system 200 and/or the machine 100.

As shown in FIG. 5, process 500 may include detecting a level of demand associated with a load of the hybrid powertrain system (block 510). For example, the controller may detect a level of demand associated with a load of the hybrid powertrain system, as described above.

As further shown in FIG. 5, process 500 may include causing power to be proportionally provided to drive the load via an engine and an electric machine in accordance with a ratio between a first power output provided via the engine and a second power output provided via the electric machine, the ratio being associated with the level of the demand, a control mode associated with the hybrid powertrain system, and an operating mode associated with the hybrid powertrain system (block 520). The control mode may include a first control mode or a second control mode, and process 500 may further include selecting the control mode, from the first control mode and the second control mode, based on a state of charge of one or more batteries that are configured to power the electric machine.

For example, the controller may cause power to be proportionally provided to drive the load via an engine and an electric machine in accordance with a ratio between a first power output provided via the engine and a second power output provided via the electric machine, the ratio being associated with the level of the demand, a control mode associated with the hybrid powertrain system, and an operating mode associated with the hybrid powertrain system, as described above. Causing the power to be provided to the one or more batteries comprises configuring an inverter to cause a direction of power flow to be from the electric machine to the one or more batteries.

The ratio may be associated with a highest efficiency metric for the level of demand from efficiency metrics associated with respective ratios including the ratio, the efficiency metrics being associated with a fuel consumption by the engine. The efficiency metrics may be based on an output of a machine learning model, where an input to the machine learning model includes historical fuel consumption of the engine at different levels of demand, different power outputs of the engine, and different power outputs of the electric machine.

In some examples, the control mode is the first control mode, and causing the power to be proportionally provided to drive the load via the engine and the electric machine includes causing the power to be proportionally provided to drive the load via the engine and the electric machine based on the level of the demand satisfying a demand threshold, wherein the demand threshold is based on a power rating of the engine.

In some examples, the control mode is the second control mode, and causing the power to be proportionally provided to drive the load via the engine and the electric machine includes causing the power to be proportionally provided to drive the load via the engine and the electric machine in response to the level of the demand causing the engine to operate in an operational mode.

Process 500 may include causing, based on the engine operating in an idling operating mode, power to be provided to the electric machine via the engine, and causing, based on power to be provided to the electric machine via the engine, power to be provided to one or more batteries, of the hybrid powertrain system, to charge the one or more batteries, wherein the electric machine is powered via the one or more batteries.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The hybrid powertrain system described herein may be used to power a load of any machine. For example, the hybrid powertrain system may be used to power a pump, or a pump system, of a hydraulic power system of a paver machine. In general, one of the main challenges with hybrid operation of a machine is controlling when the machine is to operate in a hybrid mode and/or controlling the distribution of power between an internal combustion engine and an electric motor. For example, it may be difficult to determine how much power should be provided by the internal combustion engine, how much power should be provided by the electric motor, and/or how much power should be provided to charge a battery.

The hybrid powertrain system described herein includes at least an engine, an electric machine mechanically coupled to a load, and a battery for the electric machine. The hybrid powertrain system is useful for controlling the distribution of power between the engine and the electric machine. In particular, the hybrid powertrain system may switch between an engine-only mode (e.g., where only the engine is powering the load) and a hybrid mode based on a state of charge of the battery and/or a level of demand of the load. For example, a controller of the hybrid powertrain system may use different control modes (e.g., associated with different triggers for switching a flow of power or electrical energy and/or different power distributions) based on the state of charge of the battery and/or a level of demand of the load. For example, if the SoC of the battery is below a threshold, the hybrid powertrain system may charge the battery while the level of demand of the load is relatively low (e.g., during engine idling or wait times). Moreover, the hybrid powertrain system may control the distribution of power between the engine and the electric machine based on the level of demand of the load. For example, the electric machine may assist the engine in driving the load.

Accordingly, the hybrid powertrain system may employ a smaller engine and/or a smaller cooling package (e.g., due to the smaller engine generating less heat) relative to a traditional internal combustion engine powertrain. For example, the engine may be associated with a peak load (e.g., 55 kilowatts or less) that is less than a maximum level of demand by a load of the hybrid powertrain system, because the electric machine can contribute to the peak load. In this way, the hybrid powertrain system achieves improved fuel efficiency, reduced emissions, reduced noise, and reduced heat generation, among other examples.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A controller for a hybrid powertrain system including an engine and an electric machine configured to provide power to a load, the controller comprising:
   one or more memories; and
   one or more processors configured to:
      detect a level of demand associated with the load of the hybrid powertrain system;
      determine, for the level of demand, a ratio between a first power output provided via the engine and a second power output provided via the electric machine; and
      cause power to be proportionally provided to drive the load via the engine and the electric machine in accordance with the ratio between the first power output and the second power output, a control mode associated with the hybrid powertrain system, and an operating mode associated with the hybrid powertrain system.

2. The controller of claim 1,
   wherein the one or more processors are further configured to:
      cause, based on the engine operating in an idling operating mode, power to be provided to the electric machine via the engine; and
      cause, based on power to be provided to the electric machine via the engine, power to be provided to one or more batteries, of the hybrid powertrain system, to charge the one or more batteries,
         wherein the electric machine is powered via the one or more batteries.

3. The controller of claim 2,
   wherein the one or more processors, to cause the power to be provided to the one or more batteries, are configured to:
      configure an inverter to cause a direction of power flow to be from the electric machine to the one or more batteries.

4. The controller of claim 1,
   wherein the control mode includes a first control mode or a second control mode, and wherein the one or more processors are further configured to:

select the control mode, from the first control mode and the second control mode, based on a state of charge of one or more batteries that are configured to power the electric machine.

5. The controller of claim 4,
wherein the control mode is the first control mode, and
wherein the one or more processors, to cause the power to be proportionally provided to drive the load via the engine and the electric machine, are configured to:
cause the power to be proportionally provided to drive the load via the engine and the electric machine based on the level of the demand at least meeting a demand threshold,
wherein the demand threshold is based on a power rating of the engine.

6. The controller of claim 4,
wherein the control mode is the second control mode, and
wherein the one or more processors, to cause the power to be proportionally provided to drive the load via the engine and the electric machine, are configured to:
cause the power to be proportionally provided to drive the load via the engine and the electric machine in response to the level of the demand causing the engine to operate in an operational mode.

7. The controller of claim 1,
wherein the ratio is associated with a highest efficiency metric for the level of demand from efficiency metrics associated with respective ratios including the ratio, the efficiency metrics being associated with a fuel consumption by the engine.

8. The controller of claim 7,
wherein the efficiency metrics are based on an output of a machine learning model,
wherein an input to the machine learning model includes historical fuel consumption of the engine at different levels of demand, different power outputs of the engine, and different power outputs of the electric machine.

9. A method, comprising:
causing, by a controller of a hybrid powertrain system, a load of the hybrid powertrain system to be powered via an engine of the hybrid powertrain system based on a first value of a power level associated with the load not being equal to or exceeding a power threshold during normal operation of the load;
causing, by the controller and based on the first value of the power level associated with the load not being equal to or exceeding the power threshold, power to be provided to charge one or more batteries, of the hybrid powertrain system, via an electric machine that is driven via the engine;
detecting, by the controller, that a second value of the power level associated with the load at least meets the power threshold; and
causing, by the controller, the load of the hybrid powertrain system to be powered via the engine and the electric machine based on the second value of the power level associated with the load at least meeting the power threshold,
wherein the electric machine is configured to obtain power via the one or more batteries.

10. The method of claim 9,
wherein causing the power to be provided to charge the one or more batteries comprises:
controlling a charging rate of the one or more batteries based on the power level associated with the load.

11. The method of claim 10,
wherein controlling the charging rate comprises:
decreasing the charging rate as the power level associated with the load increases.

12. The method of claim 9,
wherein the power threshold is based on a power rating of the engine.

13. The method of claim 9,
wherein causing the load of the hybrid powertrain system to be powered via the engine and the electric machine comprises:
increasing a power output of the electric machine to the load as the power level associated with the load increases.

14. The method of claim 13,
wherein a rate at which the power output of the electric machine is increased is in accordance with a ratio between the power output of the electric machine and an engine power output.

15. The method of claim 14,
wherein the ratio is based on an efficiency metric of the hybrid powertrain system.

16. A hybrid powertrain system, comprising:
an engine mechanically coupled to a load;
an electric machine that is configured to operate as both an electric motor and a generator, the electric machine being mechanically coupled to the engine and the load;
one or more batteries configured to provided power to, or receive power from, the electric machine; and
a controller configured to:
cause power to be provided from the electric machine to the one or more batteries to charge the one or more batteries based on the engine operating in an idling mode;
determine, for a level of demand of the load and based on the engine operating in an operational mode, a ratio between a first power output provided via the engine and a second power output provided via the electric machine; and
cause power to be provided to the load via the first power output and the second power output in accordance with the ratio between the first power output and the second power output.

17. The hybrid powertrain system of claim 16,
wherein the controller, to cause the power to be provided to the load, is configured to:
increase the second power output provided via the electric machine relative to the first power output provided via the engine as the level of demand of the load increases.

18. The hybrid powertrain system of claim 17,
wherein a rate at which the second power output provided via the electric machine is increased is associated with an efficiency metric.

19. The hybrid powertrain system of claim 18,
wherein the efficiency metric is based on a fuel consumption of the engine at the level of demand of the load.

20. The hybrid powertrain system of claim 18,
wherein the efficiency metric is based on an output of a machine learning model.

* * * * *